Sept. 23, 1958   H. H. RAUH   2,853,583
CONTROLLER
Filed Jan. 9, 1957   2 Sheets-Sheet 1
FIG.1.
FIG.2.
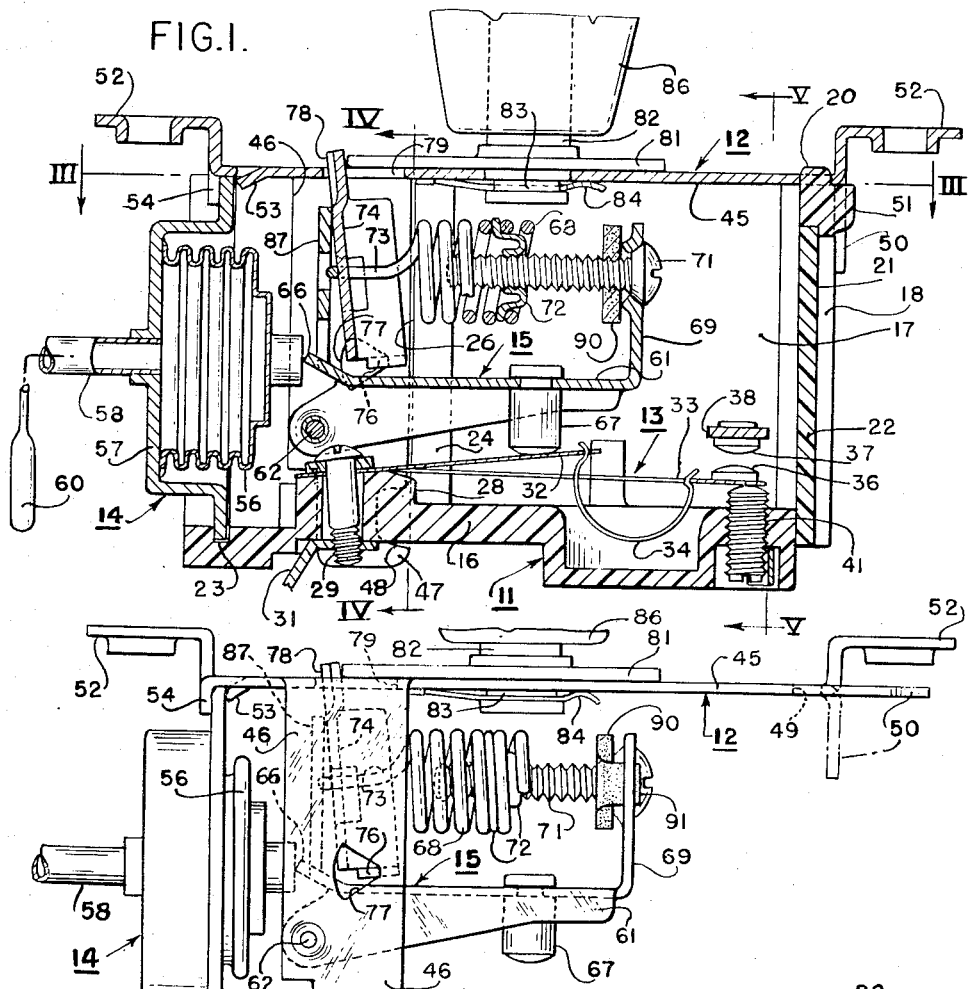
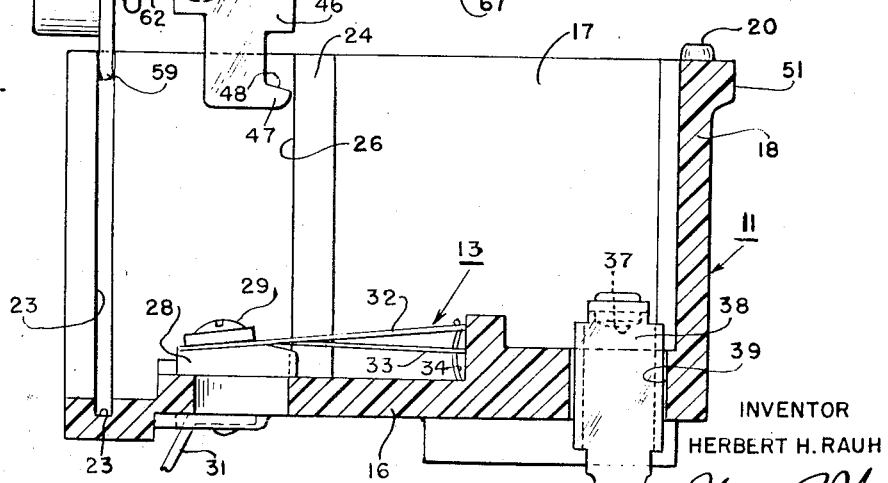
INVENTOR
HERBERT H. RAUH
BY
ATTORNEY Sept. 23, 1958      H. H. RAUH      2,853,583
CONTROLLER
Filed Jan. 9, 1957      2 Sheets-Sheet 2
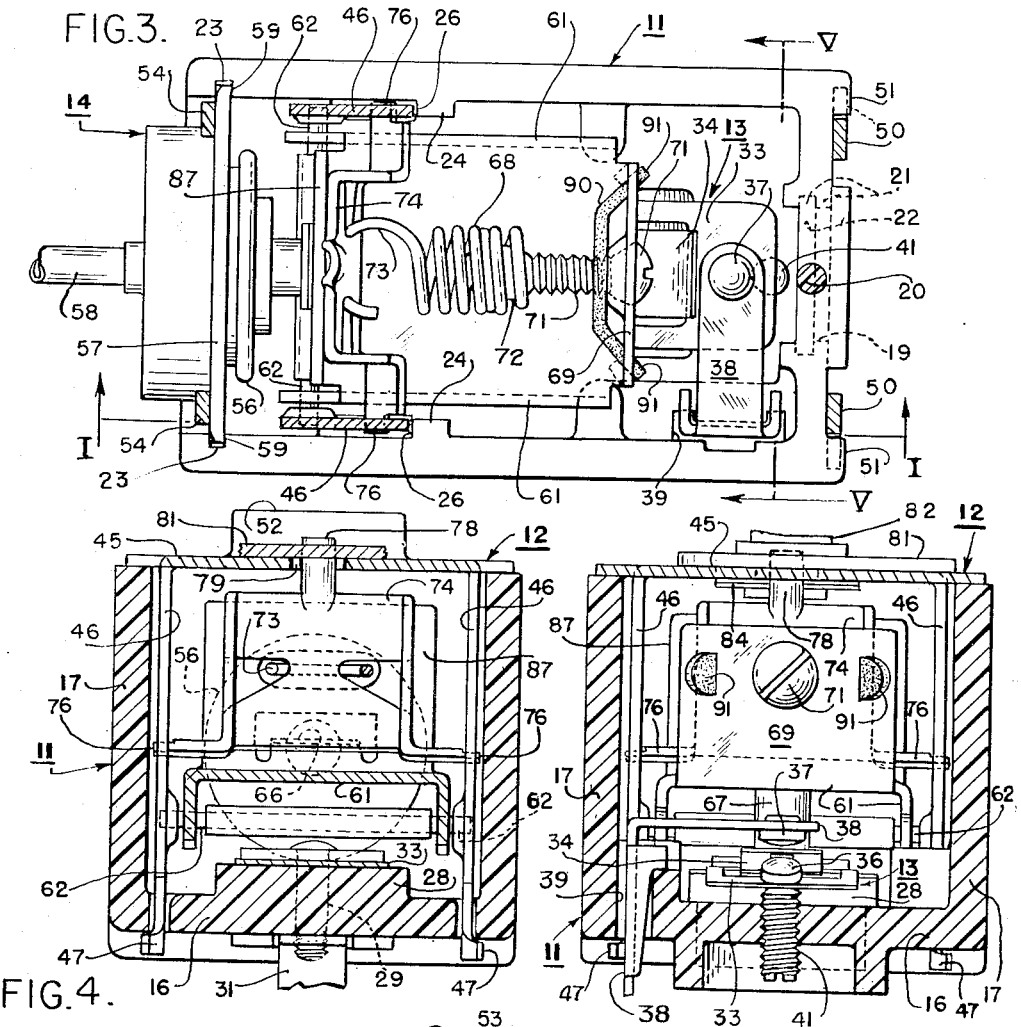
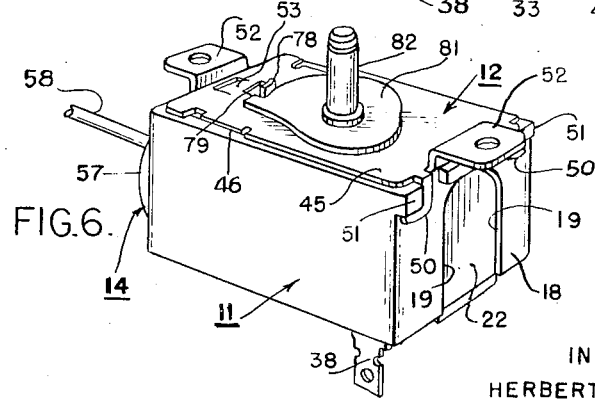
INVENTOR.
HERBERT H. RAUH
BY *William J. Foley*
ATTORNEY United States Patent Office 2,853,583
Patented Sept. 23, 1958

2,853,583
CONTROLLER

Herbert H. Rauh, Columbus, Ohio, assignor to Westinghouse Electric Corporation, East Pittsburgh, Pa., a corporation of Pennsylvania Application January 9, 1957, Serial No. 633,337

4 Claims. (Cl. 200—140)

This invention relates to controllers and more particularly to condition responsive circuit controllers of the type used for temperature regulation in a domestic refrigerator or the like.

The principal object of the invention is the provision of a controller which is inexpensive and easy to manufacture, and possesses both reliability and long life.

The controller of this invention includes a switching mechanism for an electrical circuit, a condition responsive device and an adjustable mechanism for transferring movement of the condition responsive device to the switching mechanism. The principal feature of the invention resides in the arrangement of parts which enables these components to be preassembled into two subassemblies which, when combined, produce a compact, fully operable mechanism which is completely surrounded by protective casing structure. In accordance with the invention, the two subassemblies mentioned above are structurally related to insure, upon their assembly, correct relative positioning of the several components of the controller. These structural features minimize the necessity for multiple minute adjustments of the components of the controller to assure its correct operation.

In the preferred embodiment of the invention, the controller subassemblies are built around two principal components, namely a housing and a frame. The housing is formed of electrical insulating material and has the electrical components of the controller secured therein. The frame carries and positions the other components of the controller. The frame, when assembled with the housing, properly positions the condition responsive device and the adjustable operating mechanism with respect to the housing and the switch carried thereby.

Further objects, features and advantages of the invention will be apparent from the following detailed description of the invention which refers to the accompanying drawings wherein:

Fig. 1 is a longitudinal sectional view through a controller constructed in accordance with this invention;

Fig. 2 is an exploded side view, partially in section, illustrating assembly of the controller;

Fig. 3 is a horizontal sectional view of the assembled controller taken along the line III—III in Fig. 1;

Fig. 4 is a vertical sectional view taken along the line IV—IV of Fig. 1;

Fig. 5 is a vertical sectional view taken along the line V—V of Fig. 1; and,

Fig. 6 is a perspective view on a reduced scale showing the exterior of the controller.

In the following description, phrases such as "top," "bottom," "end" and "side" are employed to distinguish portions of the controller with reference to the attitude in which the controller is illustrated in the drawings. It is to be understood, however, that in use, the controller may be mounted in any position without reference to its possessing a top or bottom.

Referring to the drawings, in detail, the controller of this invention is made up of two subassemblies which, respectively, possess as their main support elements a housing 11 and a frame 12. The housing 11 is preferably formed of electrical insulating material, such as molded plastic, and carries the electrical components of the controller including a switch mechanism indicated at 13. The frame 12 is preferably made of sheet metal and carries and positions the mechanical components of the controller including a condition responsive device 14 and an adjustable operating mechanism 15. In the completely assembled controller, as illustrated in Fig. 1, movements of the condition responsive device 14 are transferred or transmitted by the operating mechanism 15 to the switch mechanism 13, and the housing 11 and frame 12 cooperate to hold these components in their proper operating relationship.

Housing subassembly

The housing 11, as mentioned previously, is molded of plastic or other electrical insulating material to the configuration shown in the drawings whereby it possesses a bottom wall 16 from which extend a pair of spaced, substantially parallel side walls 17. The righthand end of the housing 11 includes an integral end wall 18 having an opening 19 therein. (See Fig. 6.) The vertical edges of the end wall 18 adjacent the opening 19 are provided with channel shaped guide ways 21 to receive a removable closure plate 22 for the opening 19. This closure plate 22 is also preferably made of electrical insulating material and is removable to permit access to the interior of the completely assembled controller for the purpose of adjusting the mechanism therein.

The left-hand end of the housing 11 is open to receive the condition responsive device 14 which seats in a U-shaped channel 23 formed in the side walls 17 and bottom wall 16 of the housing. Each side wall 17 of the housing has projecting from the inner surface thereof a vertically extending abutment or protuberance 24 which provides a shoulder-like surface 26 which faces, and is substantially parallel to the channel 23 in the left-hand end of the housing 11. Each shoulder 26 and the side wall portion of the channel 23 which faces it, form a pair of guiding shoulders on each side wall 17 of the housing 11 for guiding the frame 12 and the elements carried thereby into the housing 11 in a manner which will hereinafter be described.

The housing bottom wall 16 has a boss 28 in the middle thereof near the left-hand end to which the switch mechanism 13 is secured by means of a screw 29 which passes through the boss and is threadably received in an electric terminal 31 on the under surface of the bottom wall 16. The switch mechanism 13 is of the over-center, snap variety and includes a pair of resilient arms extending from the housing boss 28 and which are identified as an actuating arm 32 and an actuated, or contact carrying, arm 33. The switch 13 also includes a C spring 34 compressed between switch arms 32 and 33 and which imparts to the arm 33 a snap movement when the actuating arm 32 is moved over center. The contact carrying arm 33 has an electrical contact 36 at the free extremity thereof which cooperates with a stationary contact 37 supported thereabove by an L-shaped terminal member 38. The terminal 38 is mounted in, and extends through, an opening 39 provided therefor in the casing lower wall 16. Upward movement of the contact carrying arm 33 is, of course, limited by the stationary contact 37 in the path thereof. Downward movement of this switch arm 33 is limited by an adjustable set screw 41 threadably carried by the housing bottom wall 16. Set screw 41 acts as an adjustable stop for switch arm 33 and enables the differential, i. e., the amount of movement required of the actuating arm 32 to open and close contacts 36 and 37, to be adjusted.

*Frame subassembly*

The frame 12 cooperates with the housing 11 and functions as a supporting means for the condition responsive device 14 and the operating mechanism 15. The frame 12 is preferably constructed of sheet metal to enable it to be formed by simple stamping and bending operations, and is generally U-shaped, with the top or connecting wall 45 thereof forming a cover for the open upper end of the housing 11 opposite the bottom wall 16. The frame 12 has a pair of depending legs 46 extending from the side edges of the top wall 45 near the left-hand end thereof in a manner to be received between the housing side walls 17. The lower extremities of the legs 46 have bendable tabs 47 thereon which project through openings in the housing bottom wall 16. The tabs 47 have cam-like upper surfaces 48 for engaging the under side of the housing bottom wall 16 and function to pull the frame 12 down against the housing 11 when the tabs 47 are twisted to hold the frame 12 and the controller components mounted thereon to the housing 11. The right hand end of the frame top wall 45 has a positioning hole 49 therein for receiving a projection 20 molded on the housing end wall 18 and has a pair of hook-like projections 50 which are bendable downwardly to grasp projections 51 on the housing end wall 18. The frame wall 45 is also equipped with outwardly extending mounting flanges 52 by means of which the controller is supported.

Referring to Figures 1 and 2, it will be noted that the left hand end of the frame wall 45 has a small region 53 struck downwardly therein to form an abutment which cooperates with down-turned edge portions 54 of the frame to form a locating or positioning shoulder arrangement for the condition responsive device 14.

The condition responsive device 14 employed in this controller includes a pressure sensitive bellows element 56 carried on a mounting plate 57 and communicating with a tube 58 connected to a source of variable pressure, such as a fluid filled temperature control bulb 60. The mounting plate 57 has a generally rectangular periphery, with the upper edge being adapted to be seated against the under surface of the frame wall 12 between the shoulder arrangement 53—54. Each corner of the mounting plate 57 is preferably bent slightly as indicated at 59 to assure a close fit between the plate 57 and the channel 23.

Expansive and contractive movements of the bellows 56 are transmitted to the switch mechanism 13 by the operating mechanism 15 which is carried by and positioned relative to the condition responsive device 14 by the frame 12. Included in the operating mechanism 15 is a channel-shaped operating lever 61, which is pivotally mounted on a pin 62 trunnioned in the lower ends of the frame legs 46. The legs 46 are preferably recessed in the regions through which the pin 62 extends to permit the ends of the pin to be peened or crimped without having these pin ends extend beyond the outer surfaces of the frame legs 46. By keeping the ends of pin 62 within the confines of the frame legs 46, the possibility of interference between the ends of the pin and the side walls 17 of the housing 11 is eliminated, and operation of the control made more reliable. The pivoted end of the operating lever 61 has a projection 66 that is engageable with the bellows 56, and the opposite end of the operating lever 61 carries a pin 67, made of electric insulating material, which is adapted to engage and actuate the actuating arm 32 of the switch mechanism 13.

It can thus be seen that an expansive movement of the bellows 56 rotates the operating lever 61 clockwise, causing the pin 67 to engage and move the switch lever 32 over center to close the contacts 36 and 37. This clockwise movement of the operating lever 61 is opposed by a range spring 68 which is connected to an upwardly extending portion 69 on the right-hand end of the operating lever 61 by means of a screw 71 and a nut 72 carried between the convolutions of the spring 68. The opposite end of the spring 68 has a hook 73 formed therein which encircles a portion of a range adjustment arm 74 pivotally carried between the frame legs 46 by means of trunnion projections 76 extending laterally through openings 77 cut in the frame legs 46. The range adjustment arm 74 is provided with an extension 78 projecting through an opening 79 in the frame wall 45 to a region on the outside of the controller in which it is engaged by a range cam 81 mounted on the upper surface of the frame wall 45. The cam 81 is secured to a shaft 82 and held in place on the frame 12 by a spring clip 84 seated in a groove 83 in the shaft. The shaft 82 also has a knob 86 thereon by means of which the cam 81 is rotated.

It will be observed that rotation of the cam 81 varies the angular position of the arm 74 to increase or decrease the tension in range spring 68 and thereby vary the pressure required in bellows 56 to move the operating lever 61. The operating mechanism 15 is constructed so as to provide an "off" position of the mechanism in which the operating lever 61 is locked against movement, regardless of pressure fluctuations within the bellows 56. This "off" position is illustrated in Figs. 1 and 2, wherein the cam 81 has its portion of greatest radius in engagement with the arm extension 78 such that the arm 74 assumes its extreme counterclockwise position and is in contact with an upwardly extending finger 87 forming a part of the operating lever 61. The operating lever 61 is thereby rotated to and held in a position near the end of its range of counterclockwise movement, permitting the switch mechanism 13 to assume a position in which the contacts 36 and 37 are separated.

*Assembly*

The arrangement of parts of the controller of this invention wherein two major subassemblies (built around the housing 11 and the frame 12) may be easily fabricated and thereafter combined, renders this controller more easily and inexpensively manufactured than prior apparatus of this type. In assembling the controller, the electrical components associated with the switch mechanism 13, including the terminals 31 and 38 and the differential screw 41, are readily and easily mounted on the housing 11. The large openings at the top and left-hand end of the housing 11 render the interior of the housing 11 readily accessible to any tools required in assembling and fastening these elements to the housing.

The unique configuration of the frame 12 also facilitates assembling the mechanical components of the controller thereto. It will be noted, for example, that the leg portions 46 of the frame 12 are narrow and do not enclose or render inaccessible any considerable portion of the space beneath the frame wall 45. The leg portions 46 of the frame need only be sufficiently wide to provide a pivotal supporting structure for the operating lever 61 and the arm 74 and, as is apparent in the drawings, these members are pivoted close together. Because the interior of the frame 12 is exposed to the fingers of a person assembling the controller, the spring clip 84 is readily snapped in place in the groove 83 to hold the shaft 82 in place, and the operating lever 61, the arm 74, the spring 68 and its associated adjusting screw 71 can be readily mounted on the frame 12. The condition responsive device 14 is located on the frame 12 by inserting the upper edge of its mounting plate 57 between the shoulder arrangement 53—54 after the operating mechanism 15 is assembled to the frame 12. This shoulder arrangement 53—54 positions the condition responsive device 14 with respect to the operating mechanism 15 and assists in maintaining the condition responsive device 14 in proper operating relationship to the operating mechanism 15 during final assembly of the controller.

The final assembly of the controller wherein the two subassemblies are brought together, is clearly illustrated in Fig. 2. As shown there, the frame legs 46 are inserted into the housing 11 together with the lower edge of the condition responsive device mounting plate 57, and these two elements are guided, respectively, into the housing 11 in the proper operating relationship to one another by the housing shoulder 26 and the housing channel 23. As the frame 12 is pushed down into the housing 11 and the wall 45 thereof seats across the top of the housing, the mounting plate 57 for the condition responsive device slides down through channel 23 until the left hand end of the housing 11 is completely closed by the mounting plate 57. The bent corners 59 of the mounting plate 57 deform slightly as the mounting plate 57 is pushed down through the channel 23 and force the edges of the mounting plate back against the left shoulder of the channel 23 to positively position the mounting plate 57 and prevent shifting thereof within the channel 23.

When the frame 12 is completely assembled to the housing 11, the lower extremities of the frame legs 46 project through the bottom wall 16 of the housing and the tabs 47 thereon are twisted to lock the left-hand end of the frame 12 to the housing 11. The right-hand end of the frame 12 is properly located with respect to the housing 11 by virtue of projection 20 entering the locating hole 49 in the frame 12. The hook-like projections 50 on the frame 12, when bent down beneath the housing projections 51, securely lock the frame 12 in place in the housing 11. It can thus be seen that the final assembly of the controller 11 is a relatively simply operation which requires no special jigs or fixtures. The built-in guide ways, i. e., the shoulder 26 and the channel 23 in the housing 11, assure that the frame 12 will be properly guided into the housing 11 and that the condition responsive device 14 and the operating mechanism 15 are properly positioned with respect to one another and with respect to the switch mechanism 13 carried by the housing 11.

Calibration of the assembled controller as to its differential is easily effected by turning set screw 41 which forms a stop for switch arm 33. Range calibration of the controller is effected by means of a screw driver inserted through housing opening 19 to engage and turn the range adjustment screw 71. To prevent accidental rotation of the range adjustment scriew 71, ths screw preferably passes through a fiber lock washer 90 having ears 91 adapted to project through openings provided therefor in the operating lever extension 69.

It will be noted that all parts or elements of the controller which are moved by pressure fluctuation within the bellows 56, and which must, therefore, be free and easily movable, are completely enclosed within the controller. The operating lever 61 is mounted by means of the pin 62 which is journaled by frame leg portions 46 between the walls 17 of the housing 11 and hence completely protected by the housing 11. Furthermore, with the exception of the small opening 79 in the frame wall 45 through which the range arm extension 78 projects, the walls of the controller are completely closed to prevent the entrance of foreign objects or material which might impair or change the operating characteristics of the elements therein.

From the foregoing it will be apparent that this invention provides an improved controller structure which, not only is easily constructed and assembled, but further, contains features which assure that the elements of the controller are assembled in their proper relationship to one another, and assure that the assembled controller will give long and reliable service.

While the invention has been shown in but one form, it will be obvious to those skilled in the art that it is not so limited, but is susceptible of various other changes and modifications without departing from the spirit thereof.

What is claimed is:

1. In a circuit controller, a frame having a pair of oppositely disposed substantially parallel legs and a connecting wall therebetween, switch actuating mechanism carried by said frame legs, a condition responsive device for moving said switch actuating mechanism, a housing formed of electrical insulating material and having a bottom wall and a pair of substantially parallel side walls, said housing side walls being spaced apart a distance sufficient to receive the legs of said frame therebetween, each of said housing side walls having a pair of facing shoulders on the inner surface thereof adapted to receive therebetween one leg of said frame and a portion of said condition responsive device, and a switch carried by said housing, the construction and arrangement being such that the said shoulders in said housing locate the condition responsive device with respect to the switch actuating means and locate the switch actuating means with respect to the switch when said frame is assembled to said housing.

2. In a circuit controller, a housing formed of electrical insulating material and having an opening in one wall thereof, a switch carried by said housing interiorly thereof, a cover for the opening in said housing, said cover having a pair of spaced substantially parallel legs extending therefrom and adapted to be disposed interiorly of said housing, means carried by said legs for actuating said switch, a condition responsive device for moving said switch actuating mechanism, abutment means on said cover for initially locating said conditioning responsive device in operative position with respect to said switch actuating means during assembly of said controller, and guiding means formed integrally with said housing for guiding the legs of said cover and said condition responsive device into operative relation to one another and to said switch when said cover is assembled to said housing.

3. In a circuit controller, a frame having a pair of oppositely disposed substantially parallel legs and a connecting wall therebetween, switch actuating mechanism carried by said frame legs, a condition responsive device for moving said switch actuating mechanism, abutment means on the connecting wall of said frame for initially locating said condition responsive device in operative position with respect to said switch actuating means during assembly of said controller, a housing formed of electrical insulating material and having a bottom wall and a pair of substantially parallel side walls, said housing side walls being spaced apart a distance sufficient to receive the legs of said frame therebetween, each of said housing side walls having a pair of facing shoulders on the inner surface thereof adapted to receive therebetween one leg of said frame and a portion of said condition responsive device, and a switch carried by said housing, the construction and arrangement being such that the said shoulders in said housing locate the condition responsive device with respect to the switch actuating means and locate the switch actuating means with respect to the switch when said frame is assembled to said housing.

4. In a circuit controller, a housing formed of electrical insulating material and having a pair of spaced, substantially parallel side walls and a bottom wall connecting said side walls, a switch mechanism disposed on the bottom wall of said housing, a U-shaped metallic frame having a bight portion shaped to form a cover for the top of said housing and a pair of legs extending downwardly from opposite side edges of the bight portion near one end thereof, a switch operating lever pivotally mounted on and between the legs of said frame, an arm pivotally mounted on and between the legs of said frame, a spring disposed between said arm and said lever and adapted to bias said lever in one direction, and a pressure responsive device for moving said switch operating lever against the bias of said spring, said pressure responsive device having an expansible element and a mounting plate, the bight portion of said frame having shoulders at the said one end thereof adapted to engage an edge portion of the mounting plate of said pressure responsive device to position said pressure responsive device in operative relation to said lever, means forming a pair of facing shoulders on the inside of each of said housing side walls near one end of said housing, each pair of shoulders being adapted to receive therebetween one of the legs of said frame and one edge portion of said mounting plate, the lower extremity of each of said frame legs having a bendable portion adapted to engage portions of said housing to retain said frame in said housing.

References Cited in the file of this patent

UNITED STATES PATENTS

| | | |
|---|---|---|
| 2,233,336 | Bentley | Feb. 25, 1941 |
| 2,459,837 | Popp | Jan. 25, 1949 |
| 2,670,417 | Raney | Feb. 23, 1954 |
| 2,672,536 | Rosing et al. | Mar. 16, 1954 |
| 2,691,084 | Miller | Oct. 5, 1954 |